(No Model.) 2 Sheets—Sheet 2.
J. SIEVERS, Jr.
HUNTING DECOY.
No. 586,145. Patented July 13, 1897.
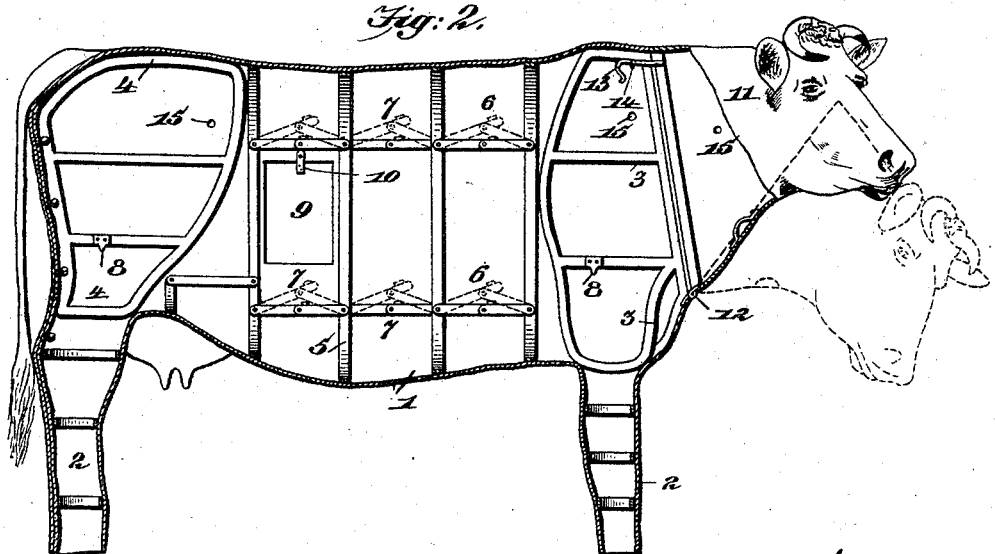
Witnesses
Inventor
John Sievers, Jr.
By his Attorneys,

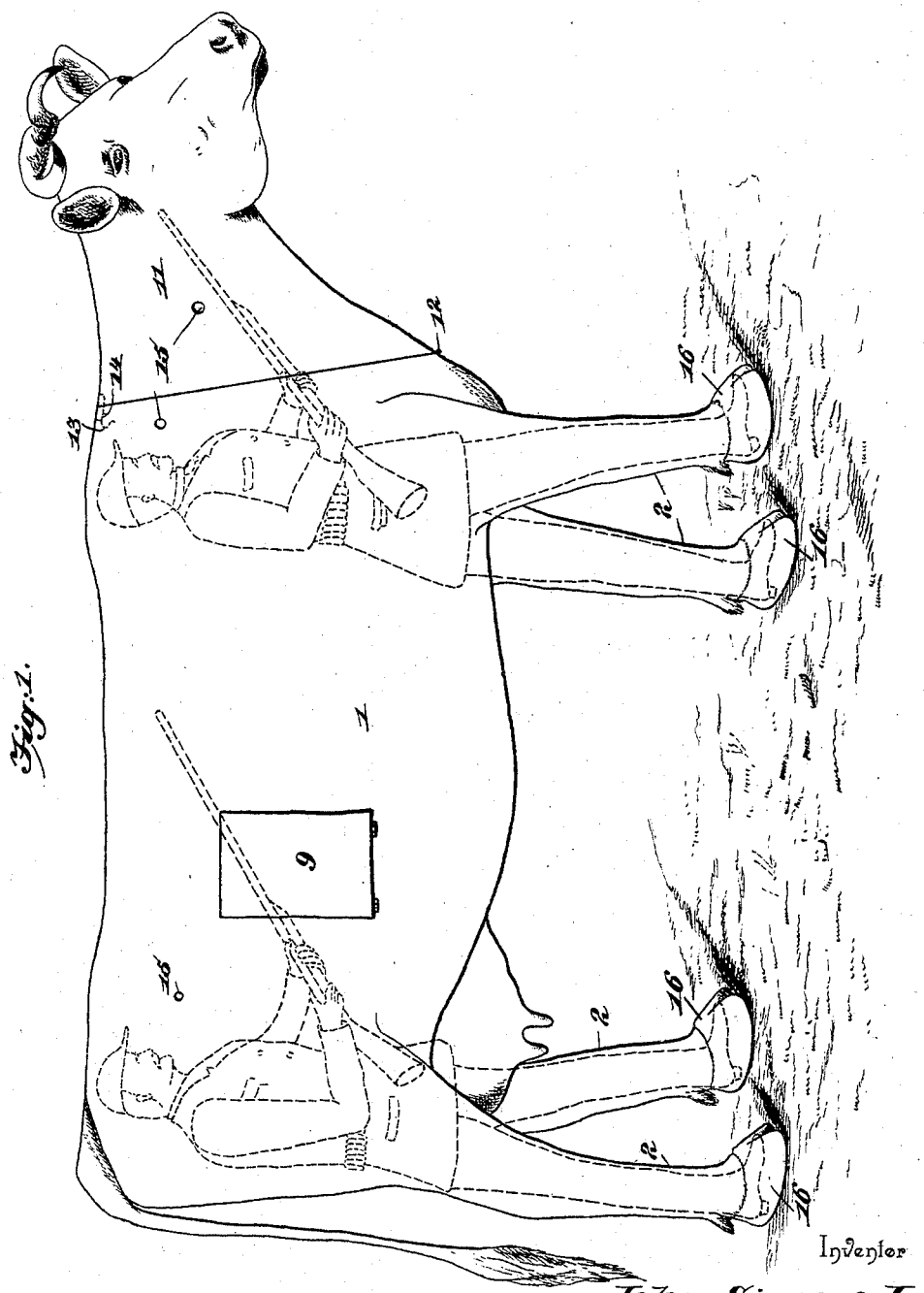

UNITED STATES PATENT OFFICE.

JOHN SIEVERS, JR., OF AMES, NEBRASKA.

HUNTING-DECOY.

SPECIFICATION forming part of Letters Patent No. 586,145, dated July 13, 1897.

Application filed November 21, 1896. Serial No. 612,989. (No model.)

*To all whom it may concern:*

Be it known that I, JOHN SIEVERS, Jr., a citizen of the United States, residing at Ames, in the county of Dodge and State of Nebraska, have invented a new and useful Hunting-Decoy, of which the following is a specification.

My invention relates to hunting-decoys, and has for its object to provide a hollow decoy animal adapted to be supported and operated by an inclosed hunter, for whom the decoy forms a concealing shell or blind.

Further objects and advantages of this invention will appear in the following description, and the novel features thereof will be particularly pointed out in the appended claims.

In the drawings, Figure 1 is a view of a decoy constructed in accordance with my invention. Fig. 2 is a longitudinal section of the same. Fig. 3 is a view showing the positions of the parts when the hunters desire to shoot at the game. Fig. 4 is a detail view of one of the folding braces.

Similar numerals of reference indicate corresponding parts in all the figures of the drawings.

In the embodiment of my invention which is illustrated in the drawings, 1 designates a preferably flexible shell consisting of hide, canvas, or the equivalent thereof, exteriorly decorated or marked to represent the animal in imitation of which the decoy is constructed, said shell being held in the proper shape by means of a skeleton framework, which is preferably constructed to fold, and thereby adapt the decoy to be packed into a small space for transportation. In the construction illustrated the shell is made in the form of a quadruped, of which the leg portions 2 are adapted to receive the legs of the hunters that are concealed therein, and in addition to front and rear distending brackets 3 and 4 the interior of the shell is fitted with ribs 5, spaced apart by means of folding braces 6. The sections of these braces are preferably connected by stop-hinges 7, whereby when extended they are held firmly in that position to maintain the shape of the animal, but which may be "broken" to allow the ribs to be folded into contiguous parallel planes when it is desired to transport the decoy. Arranged on the framework, as upon the front and rear brackets 3 and 4, are engaging devices 8, consisting in the construction illustrated of hooks adapted to engage the upper edges of the belts of the hunters, whereby the weight of the decoy is supported thereby without interfering with the movements of the hunters, either in walking, as in approaching their game, or in discharging their pieces.

Formed in the sides of the shell are doors 9, which are preferably hinged to open downwardly and outwardly and are provided with suitable catches or locking devices 10, whereby they are normally held closed, these doors being within convenient reach of a hunter occupying the rear portion of the decoy, as indicated in dotted lines in Fig. 1.

When it is desired to adapt the decoy for the use of two persons, the neck portion 11 of the shell is constructed separate from the body portion of the shell and is hinged at its lower edge, as shown at 12, to swing downwardly, and thereby allow the hunter occupying the front portion of the shell to discharge his piece over the neck portion of the animal. A spring-catch 13 is arranged at the upper side of the neck to engage a suitable stud 14 on the body portion, and thereby hold the neck portion in its normal position, and peep-holes or inspection-openings 15 are arranged at convenient points in the shell through which the hunter or hunters may view the game, whereby they may so dispose the decoy as to facilitate their attack upon the game. The lower extremities of the leg portions of the decoy may, as shown in Fig. 1, be provided with hoof portions 16 to conceal the feet of the hunters.

The construction of the apparatus is such that the hunter is not exposed while operating or while discharging a fowling-piece. The hunter occupies an upright position at all times within the decoy, and there is sufficient space therein to enable him to manipulate a fowling-piece in order to extend it at pleasure through an opening in either side of the shell. Hence when it is desired to discharge the piece it is simply necessary to displace one of the movable sections of the shell and extend the muzzle of the weapon, the hunter meanwhile remaining concealed.

From the above description it will be seen that the essential feature of the invention consists in the construction of a hollow decoy animal of any suitable shape and dimensions, wherein a hunter or hunters may be concealed without preventing their use of hunting-arms, and that whether the decoy is made in the shape of a cow or other animal is immaterial to the invention, and, furthermore, that various changes in the form, proportion, and the minor details of construction may be resorted to without departing from the spirit or sacrificing any of the advantages of this invention.

Having described my invention, what I claim is—

1. A hollow hunting-decoy having a shell of flexible material provided with extensions forming leg portions, and a jointed collapsible distending frame fitted within the shell and including jointed braces adapted, when extended, to hold the members of the frame in their operative positions, substantially as specified.

2. A hollow hunting-decoy having a shell of flexible material within which a hunter may be concealed, and provided with hollow extensions forming leg portions to receive the legs of the hunter, and an inclosed distending framework comprising parallel annular ribs 5, connecting jointed braces 7, and front and rear brackets 3 and 4, substantially as specified.

3. A hollow hunting-decoy having a body portion provided with extensions forming leg portions, the side walls of said body portion being provided contiguous to the leg portions with movable sections adapted to be displaced to allow an inclosed hunter without exposure of himself to extend and discharge a fowling-piece, substantially as specified.

4. A hollow hunting-decoy adapted to accommodate a plurality of hunters and having leg portions in which the hunters may stand, the shell of the body portion having independent movable sections contiguous to each pair of leg portions adapted to be displaced by the hunters to allow them without exposure beyond the shell to extend and discharge fowling-pieces, substantially as specified.

5. A hollow hunting-decoy having a body portion in which a hunter in an upright position may be concealed, and provided with a hinged neck portion adapted to be displaced downwardly to open the front end of the body portion and allow egress of the muzzle of a fowling-piece, and means for normally holding said neck portion in its closed position, substantially as specified.

6. A hollow hunting-decoy having a body portion provided with a hinged neck portion adapted to be depressed to open the front end of the body portion at its top and sides, a locking device accessible within the shell for securing the neck portion in its normal position, and an interiorly-accessible handle on the neck portion, substantially as specified.

7. A hollow decoy, having a body portion within which a hunter may be concealed, and provided with communicating leg portions, adapted to receive and conceal the legs of the hunter, and at the same time permit him to advance the decoy by walking, and a collapsible distending frame fitted within the shell to hold it in proper position, said frame being made in skeleton form, so as to not interfere with the person concealed within the decoy, substantially as described.

8. A hollow decoy, having a body portion within which a hunter may be concealed, and provided with communicating leg portions, adapted to receive and conceal the legs of the hunter, and at the same time permit him to advance the decoy by walking, and a collapsible distending frame fitted within the shell to hold it in proper position, said frame being made in three parts, front, rear and intermediate sections, each of which is in skeleton form, and is independent of the others, substantially as described.

In testimony that I claim the foregoing as my own I have hereto affixed my signature in the presence of two witnesses.

JOHN SIEVERS, JR.

Witnesses:
JAMES SCILLEY,
HENRY SMITH.